(12) United States Patent
Suzuki et al.

(10) Patent No.: US 8,136,993 B2
(45) Date of Patent: Mar. 20, 2012

(54) SLIDING BEARING

(75) Inventors: Mikio Suzuki, Inuyama (JP); Yuto Otsuki, Inuyumi (JP); Hideo Nakamura, Inuyama (JP)

(73) Assignee: Daido Metal Co., Ltd., Naka-Ku, Nagoya (JP)

( * ) Notice: Subject to any disclaimer, the term of this patent is extended or adjusted under 35 U.S.C. 154(b) by 294 days.

(21) Appl. No.: 12/407,844

(22) Filed: Mar. 20, 2009

(65) Prior Publication Data
US 2009/0238504 A1 Sep. 24, 2009

(30) Foreign Application Priority Data
Mar. 21, 2008 (JP) .................................. 2008-072994

(51) Int. Cl.
*F16C 33/02* (2006.01)
(52) U.S. Cl. ........................................ 384/276; 384/913
(58) Field of Classification Search .................. 384/276, 384/294, 912, 913
See application file for complete search history.

(56) References Cited

U.S. PATENT DOCUMENTS

| | | | | |
|---|---|---|---|---|
| 1,770,582 A * | 7/1930 | Pike | ................ | 384/276 |
| 2,377,681 A * | 6/1945 | Etchells | .................. | 29/898.058 |
| 3,985,407 A * | 10/1976 | Oliver et al. | .................. | 384/276 |
| 4,206,268 A | 6/1980 | Roemer et al. | | |
| 4,896,368 A * | 1/1990 | Just | ............................ | 384/276 |
| 5,700,093 A * | 12/1997 | Hiramatsu et al. | ............ | 384/276 |
| 5,803,614 A * | 9/1998 | Tsuji et al. | .................... | 384/276 |
| 6,012,850 A * | 1/2000 | Kagohara et al. | ............. | 384/276 |
| 6,178,639 B1 | 1/2001 | Lytwynec et al. | | |
| 6,234,678 B1 * | 5/2001 | Tsuji et al. | .................... | 384/276 |
| 6,267,508 B1 * | 7/2001 | Bank et al. | ..................... | 384/276 |
| 6,309,759 B1 | 10/2001 | Tomikawa et al. | | |
| 6,575,635 B1 * | 6/2003 | Tsuji et al. | .................... | 384/276 |
| 6,648,513 B2 * | 11/2003 | Okamoto et al. | ............. | 384/276 |
| 6,652,675 B2 * | 11/2003 | Sakai et al. | .................... | 148/433 |
| 6,688,769 B2 * | 2/2004 | Takayanagi et al. | ........... | 384/276 |
| 6,863,441 B2 * | 3/2005 | Kawachi et al. | ............... | 384/276 |
| 6,863,994 B2 * | 3/2005 | Tanaka et al. | ................. | 428/626 |
| 6,902,324 B2 * | 6/2005 | Steffens et al. | ............... | 384/279 |
| 6,997,612 B2 * | 2/2006 | Kawachi et al. | ............... | 384/42 |
| 7,229,699 B2 * | 6/2007 | Toth et al. | ..................... | 428/559 |
| 7,387,443 B2 * | 6/2008 | Andler et al. | ................. | 384/276 |
| 7,455,458 B2 * | 11/2008 | Johal et al. | .................... | 384/276 |
| 7,458,726 B2 * | 12/2008 | Seilheimer | .................... | 384/276 |
| 7,651,784 B2 * | 1/2010 | Rumpf | ........................... | 428/642 |
| 7,862,902 B2 * | 1/2011 | Zidar | ............................ | 428/642 |
| 2006/0182375 A1 * | 8/2006 | Kraemer et al. | ............. | 384/294 |
| 2007/0092173 A1 * | 4/2007 | Tsuji et al. | .................... | 384/276 |

FOREIGN PATENT DOCUMENTS

| JP | 2002513890 | 5/2002 |
|---|---|---|
| WO | 99/57448 | 11/1999 |

* cited by examiner

*Primary Examiner* — Thomas R Hannon
*Assistant Examiner* — Keith Minter
(74) *Attorney, Agent, or Firm* — Browdy and Neimark, PLLC

(57) ABSTRACT

A cylindrical sliding bearing having a cylindrical steel back metal, and a bearing alloy layer, serving as a sliding surface, on the inside of the steel back metal is provided. The cylindrical sliding bearing further have a coat layer of Bi or a Bi-based alloy formed on the outer back surface of the steel back metal. Preferably, the coat layer is made from the Bi-based alloy of 1 to 30 mass % of one or more kinds of Sn, Pb, In, Ag and Cu; and the balance being Bi and inevitable impurities.

2 Claims, 3 Drawing Sheets (A)

(B)

(C)

SLIDING BEARING

TECHNICAL FIELD

The present invention relates to a cylindrical sliding bearing having a bearing alloy layer, which serves as a sliding surface, on the inside of a steel back metal.

BACKGROUND OF THE INVENTION

Conventionally, for a thin-wall cylindrical sliding bearing manufactured by press-forming of a multilayer slide material composed of a steel back metal and a sliding bearing alloy layer, a flash plating layer (also referred to as "coat layer") has been deposited so as to coat the outer back surface of the steel back metal opposing to the inner peripheral surface on which the bearing alloy layer is formed and side edges thereof as described in e.g. JP-A-2002-513890 (see paragraph [0016]). The flash plating layer is deposited to prevent the steel back metal from corrosion and to give it a bright and attractive appearance. As the flash plating layer, a Sn or Pb—Sn plating layer having a thickness of 1 μm or smaller is used.

As shown in FIGS. 1 and 2, the above-described thin-wall cylindrical sliding bearing 1' is, in use, press-fitted in a bearing housing 4 by a press-fitting jig 3. Through the press fitting process, the cylindrical sliding bearing 1' is fixed by generated pressure by means of an interference in a radial direction of the bearing. At the same time, the cylindrical sliding bearing 1' must be caused to fit in with the inner diameter of the bearing housing 4, since the outer diameter of the cylindrical sliding bearing 1' manufactured by the press-forming does not have a true circular shape. When the cylindrical sliding bearing 1 whose outer diameter is not a true circle shape is press-fitted in the bearing housing 4, as shown in FIGS. 2A and 2B, at the early stage of the press-fitting process, the cylindrical sliding bearing 1' is liable to be tilt when it is press-fitted in the inner diameter of the bearing housing 4, so that disadvantageously a defect such as galling is liable to occur. If a Sn or Pb—Sn flash plating layer 2' is deposited, an advantage of preventing galling is also offered since the Sn or Pb—Sn flash plating layer 2' can lower friction between the back surface of the cylindrical sliding bearing 1' and the inner peripheral surface of the bearing housing 4 during the press fitting.

SUMMARY OF THE INVENTION

In the case where the flash plating layer is of Sn, Pb, or an alloy thereof, the flash plating layer is soft and highly ductile, and therefore flows plastically. Therefore, at the press-fitting, as shown in FIGS. 2C and 3, large press-fitting remnants 5 are developed at the boundary between the bearing housing 4 and the top surface of the cylindrical sliding bearing 1' (at an edge of the bearing housing), and remain and adhere at this portion, which may pose a problem that the large press-fitting remnants 5 intrude into a bearing device or a lubricating oil passage or that the large press-fitting remnants 5 intrude in the bearing sliding surface during a process for inserting a shaft into the bearing housing 4 press-fitted with the bearing 1'.

The invention is provided to solve the problem. An objective of the invention is to provide a sliding bearing in which less press-fitting remnants chipped away from the plating layer during fit-pressing intrude into the bearing device, the lubricating oil passage or the bearing sliding surface.

To achieve the above objective, the invention provides a cylindrical sliding bearing with a bearing alloy layer, which serves as a sliding surface, on the inside of a steel back metal. A coat layer of Bi or a Bi-based alloy is formed on the outer back surface of the steel back metal.

Bi or the Bi-based alloy provides advantages same as those of Sn, Pb or an alloy thereof in terms that it is soft and lowers friction during the press-fitting to enhance the press fitting ability. Since the coat layer of Bi or the Bi-based alloy has a very low ductility and is less liable to flow plastically, if it is chipped at the end part of the bearing housing, it is subjected to brittle fracture, so that press-fitting remnants becomes very fine, and does not remain and adhere to the end part of the bearing housing. That provides an advantage that the press-fitting remnants are less liable to intrude into the bearing device, the bearing lubricating oil passage or between the bearing sliding surface and a shaft surface.

Preferably, the coat layer of the Bi-based alloy consists of 1 to 30 mass % of one or more of Sn, Pb, In, Ag and Cu and the balance being Bi and inevitable impurities.

Bi has an effect of preventing rust on a steel on the back surface of the cylindrical sliding bearing, during manufacturing of the cylindrical sliding bearing and press-fitting into the bearing housing. Alloying by containing 1 to 30 mass % of one or more of Sn, Pb, In, Ag and Cu in Bi further improves the rust prevention effect. The Bi-based alloy has the same crystal structure as that of Bi, and has properties of very low ductility and less plastic flow. Thus, if the coat layer is chipped at the edge part of the bearing housing, the coat layer is subjected to brittle fracture, and therefore the press-fitting remnants become very fine and also do not remain and adhere to the end part of the bearing housing. Therefore, the press-fitting remnants are less liable to intrude into the bearing device, the bearing lubricating oil passage, or between the bearing sliding surface and a shaft surface. If the amount of one or more of Sn, Pb, In, Ag and Cu is lower than 1 mass %, the rust preventive effect cannot be improved further, and if the amount exceeds 30 mass %, the property of being liable to be subjected to brittle fracture due to its very low ductility and low plastic flow is diminished since alloying components Sn, Pb, In and Ag has the properties having a high ductility and liable to flow plastically. Especially, if the amount exceeds 50 mass %, the property is almost lost.

DETAILED DESCRIPTION OF THE INVENTION

Figure 1:
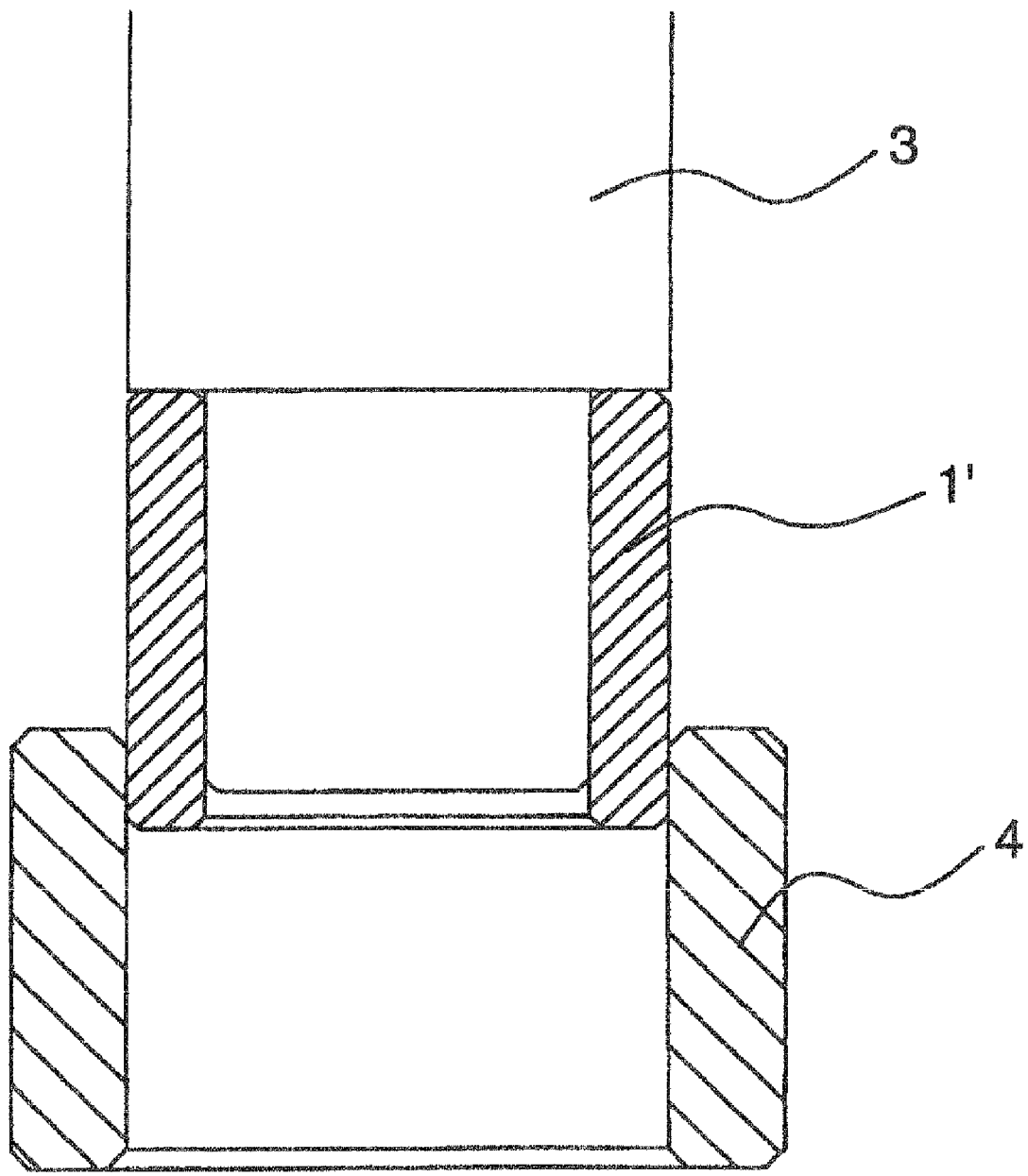
FIG. 1 is a schematic sectional view showing that a cylindrical sliding bearing is press-fitted in a bearing housing by using a press fitting jig.
Figure 2:
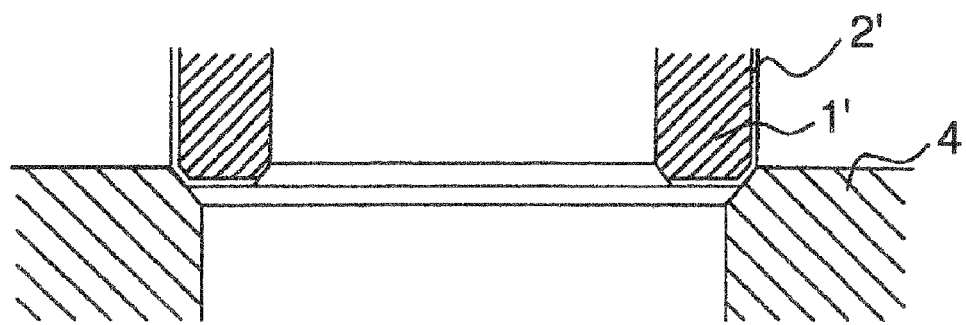
FIGS. 2A to 2C are views schematically showing that press-fitting remnants are formed when a cylindrical sliding bearing is press-fitted in a bearing housing.
Figure 2:
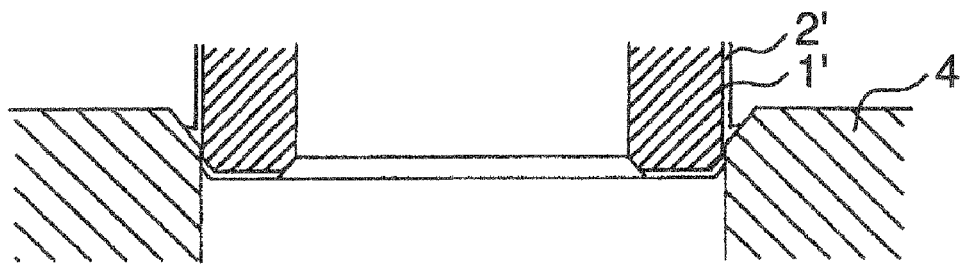
Figure 2:
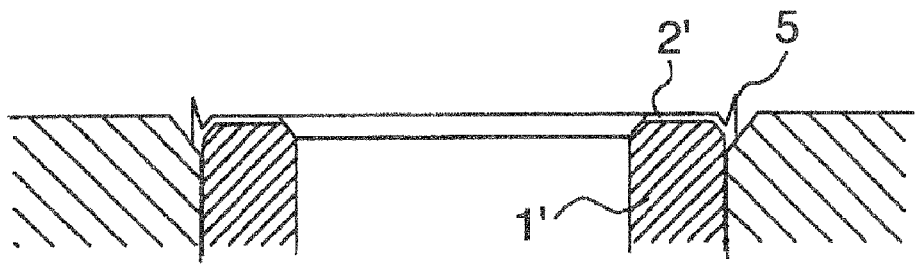
Figure 3:
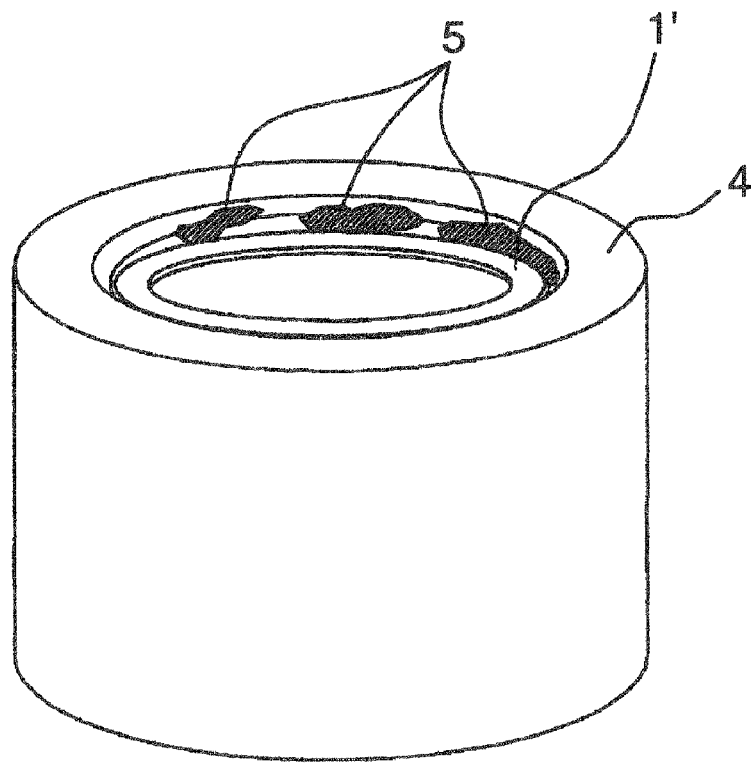
FIG. 3 is a perspective view showing a state in which a cylindrical sliding bearing is press fitted in a bearing housing.
Figure 4:
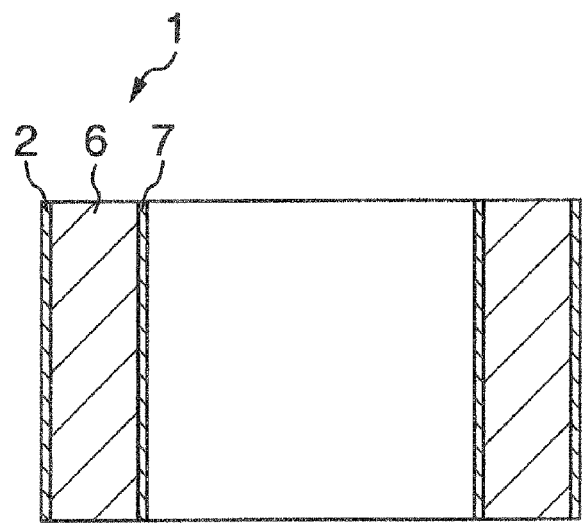
FIG. 4 is a sectional view of a cylindrical sliding bearing according to the invention.

An embodiment of the present invention will be described below referring to FIG. 4. A flat plate-shaped multilayer bearing material composed of a steel back metal 6 and a bearing alloy 7 is press-formed to manufacture a cylindrical sliding bearing 1 so that the steel back metal forms an outer peripheral surface, like the above-mentioned cylindrical sliding bearing 1' shown in FIGS. 1 and 2. Thereafter, a coat layer 2 of Bi or a Bi-based alloy is formed on a back surface of the steel back metal through an electroplating process or the like. The method for forming the coat layer 2 of Bi or the Bi-based alloy on the back surface of the cylindrical sliding bearing 1 is not limited to the electroplating process, and the coat layer can be formed through any other general film forming methods such as a spraying method and a thermal spraying method. Alternatively, in order to improve a bonding strength between the back surface of the steel back metal and the coat layer 2 of Bi or the Bi-based alloy, the coat layer 2 may be formed after a general preliminary treatment such as degreasing and surface roughening, or the coat layer 2 may be formed after an intermediate layer of a metal, such as Ag, Cu or the like or an alloy thereof, has been formed on the back surface of steel back metal. The coat layer 2 is preferably formed only on the outer back surface of the steel back metal excluding the inner sliding surface of the cylindrical sliding bearing 1. However, considering the productivity, the coat layer 2 may also be formed on the sliding surface at the same time.

The thickness of the coat layer 2 of Bi or the Bi-based alloy is preferably in a range of 0.5 to 10 μm in order to improve the press-fitting ability by lowering friction between the back surface of the cylindrical sliding bearing 1 and the inner peripheral surface of a bearing housing 4. While bismuth (Bi) also has a rust preventive effect for the steel back metal of the cylindrical sliding bearing 1, if 1 to 30 mass % of one or more kinds of Sn, Pb, In, Ag and Cu is contained, the rust preventive effect can be further improved by the alloying.

EXAMPLES

Next, the test results of a press-fitting ability comparison test on the cylindrical sliding bearing 1 manufactured as described above are explained with reference to Table 1.

TABLE 1

| No. | Composition | Thickness (μm) | Maximum length of press fitting remnants (mm) | Galling |
|---|---|---|---|---|
| Example 1 | Bi | 1 | 0.1 | Not Occurred |
| Example 2 | Bi-2 mass % Sn | 1 | 0.1 | Not Occurred |
| Comparative example 11 | Pb | 1 | 5 | Not Occurred |
| Comparative example 12 | Sn | 1 | 5 | Not Occurred |
| Comparative example 13 | None | — | — | Occurred |

In examples 1 and 2 in Table 1, a multilayer material composed of a steel back metal 6 and an Al-based bearing alloy 7 was press-formed into a cylindrical shape having an outer diameter of 30 mm, an inner diameter of 27 mm, and a width of 20 mm so that the steel back metal formed an outer peripheral surface, and then a chamfer having a length of 0.8 mm and an angle of 20° was formed on the outer diameter surface of both end in a width direction of the multilayer material by cutting, by which the cylindrical sliding bearing 1 was manufactured. Next, the coat layer 2 of Bi or a Bi-based alloy (Bi-2 mass % Sn) having a composition in Table 1 was formed on the back surface of the cylindrical sliding bearing 1 and the steel back metal surface in the chamfered part through the electroplating process so that the thickness of the coat layer 2 was 1 μm.

As comparative examples 11 and 12, the coat layer 2 having a composition of Pb (comparative example 11) or Sn (comparative example 12) was formed on the back surface of the cylindrical sliding bearing 1, which was manufactured under the same conditions as those in examples 1 and 2, and on the steel back metal surface in the chamfered part through the electroplating process so that the thickness of the coat layer 2 was 1 μm. As comparative example 13, the cylindrical sliding bearing 1 on which no coat layer was formed was used as it was. Examples 1 and 2 and comparative examples 11 to 13 have the outer diameter of the cylindrical sliding bearing 1 slightly larger than the inner diameter of the bearing housing 4 used for the press-fitting ability comparison test, by an interference for fixing the sliding bearing.

On the other hand, as the bearing housing 4 in which the above-described cylindrical sliding bearings of examples 1 and 2 and comparative examples 11 to 13 were to be press-fitted, an Fe-alloy bearing housing 4 having a press fitting part for the cylindrical sliding bearing, which had a 30 mm inner diameter, was manufactured. Against this bearing housing 4, the cylindrical sliding bearing was pressed via the press-fitting jig 3, and the size of the press-fitting remnants 5 generated by press-fitting was measured. Thereafter, the cylindrical sliding bearing 1 was drawn out of the bearing housing 4, and the presence of a linear flaw caused by galling was observed visually. The measurement and observation results are given in Table 1. On the bearing housing 4, a chamfer of C0.5 was formed at the inner diameter part on the end where the cylindrical sliding bearing was press-fitted.

The coat layer 2 of Pb or Sn of the comparative examples 11 and 12 was scraped by the edge of the press-fitting part of the bearing housing 4. However, the coat layer 2 plastically flows due to a high ductility of Sn and Pb, so that press-fitting remnants 5 were produced as large as 5 mm at the maximum. Also, the press-fitting remnants 5 remained and adhered to the edge of the press-fitting part of the bearing housing 4. The maximum lengths of the press-fitting remnants of comparative examples 11 and 12 are given in Table 1, which were obtained by measuring the press-fitting remnants 5 remained and adhering to the edge of the press-fitting part of the bearing housing 4 by using caliper square. Also, in comparative examples 11 and 12, galling did not occur since the coat layer 2 of Pb or Sn lowered friction between the back surface of the cylindrical sliding bearing 1 and the inner peripheral surface of the bearing housing 4 during the press fitting. In comparative example 13, since the cylindrical sliding bearing 1 is not provided with the coat layer 2, the occurrence of galling during the press-fitting was verified although the press fitting remnants 5 were not generated.

On the other hand, although the Bi coat layer of example 1 was scraped by the edge of the press fitting part of the bearing housing 4, the coat layer was subjected to brittle fracture due to its low ductility and was broken into fine pieces, so that the press fitting remnants 5 were as small as 0.1 mm at the maximum, and also did not remain and adhere to the edge of the press fitting part of the bearing housing 4. For the coat layer of the Bi-based alloy of example 2, the same effect as that of example 1 was verified. The reason is that the Bi-based alloy has the same crystal structure as that of Bi, and has a property that the ductility of Bi is low, so that the coat layer is scraped by the edge of the press fitting part of the bearing housing 4, but is subjected to brittle fracture and broken into fine pieces. The maximum lengths of press fitting remnants of examples 1 and 2 given in Table 1 were obtained by the observation using a stereoscopic microscope since the press fitting remnants 5 were small. Furthermore, in examples 1 and 2, the coat layer 2 of Bi or the Bi-based alloy (Bi-2 mass % Sn) lowered friction between the back surface of the cylindrical sliding bearing 1 and the inner peripheral surface of the bearing housing 4 during the press fitting, so that galling did not occur. While only example 2 is given as the Bi-based alloy on which the press fitting test was conducted, the present inventors verified that other Bi-based alloys including 1 to 30 mass % of one or more of Sn, Pb, In, Ag and Cu and the balance being Bi have a property common to that of Bi that the alloys are subjected to brittle fracture, and are broken into fine pieces because they have a very low ductility and are less liable to flow plastically.

The invention claimed is:

1. A cylindrical sliding bearing assembly comprising
a cylindrical steel back metal,
a bearing alloy layer, serving as a sliding surface, on an inside surface of the steel back metal, and
a coat layer of Bi or a Bi-based alloy on an outer back surface of the steel back metal;
wherein said cylindrical bearing is press-fit within a bearing housing with said coat layer of Bi or Bi-based alloy in contact with and pressed against an inside surface of the bearing housing.

2. The bearing assembly according to claim 1, wherein the coat layer is made from the Bi-based alloy consisting of:
1 to 30 mass % of one or more of Sn, Pb, In, Ag and Cu; and
the balance being Bi and inevitable impurities.

* * * * *